United States Patent [19]

Greidinger et al.

[11] 4,173,582

[45] Nov. 6, 1979

[54] METHOD FOR THE MANUFACTURE OF IMPROVED UREAFORM FERTILIZER

[75] Inventors: Dahlia S. Greidinger; Liuba Cohen nee Girshowitsh, both of Haifa; Shimon Epstein, Kiryat Motzkin, all of Israel

[73] Assignee: Fertilizers & Chemicals Ltd., Haifa, Israel

[21] Appl. No.: 670,687

[22] Filed: Mar. 26, 1976

[30] Foreign Application Priority Data

Apr. 22, 1975 [IL] Israel .................................. 47145

[51] Int. Cl.² ........................................... C07C 127/15
[52] U.S. Cl. ..................... 260/553 R; 71/28; 528/233; 528/242; 528/270
[58] Field of Search ................. 71/28, 29; 260/555 R, 260/553 R

[56] References Cited

FOREIGN PATENT DOCUMENTS

| | | |
|---|---|---|
| 737468 | 9/1955 | United Kingdom ......................... 71/28 |
| 789075 | 1/1958 | United Kingdom ......................... 71/28 |
| 875907 | 8/1961 | United Kingdom ......................... 71/28 |

OTHER PUBLICATIONS

New Synthetic Nitrogen Fertilizers, Clark et al., vol. 40, #7, Ind. & Eng. Chem., Jul. 1948, pp. 1178–1183.

*Primary Examiner*—Ferris H. Lander
*Attorney, Agent, or Firm*—John S. Roberts, Jr.

[57] ABSTRACT

The present invention relates to a method for the manufacture of an improved ureaform fertilizer. The method consists in the condensation of urea and formaldehyde carried out in a controlled system having a pH between 3.5 and 4.2 wherein the overall concentration of the reagents is in the range of 20 to 40% by weight. The ratio between the reagents is between 1.2 to 1.5 moles of urea to 1 mole of formaldehyde and the temperature of the reaction is kept between 15° C. to 40° C. Examples of preferred controlled systems are $H_3PO_4$-$KH_2PO_4$ and $H_3PO_4$-$NH_4H_2PO_4$. The method can also be performed in a continuous manner giving rise to an overall quantitative yield, and being temperature self-regulating.

The ureaform obtained by the method has an activity index of over 75 and excellent physical properties.

5 Claims, No Drawings

METHOD FOR THE MANUFACTURE OF IMPROVED UREAFORM FERTILIZER

The present invention relates to a method for the manufacture of improved ureaform fertilizer.

Ureaform is the generic name for the solid fertilizer grade urea-formaldehyde condensates which were developed to provide a controlled release of nitrogen to growing plants. In 1964, the Association of American Fertilizer Control Officials adopted the following definition for ureaform fertilizer: "Urea-formaldehyde fertilizer materials are reaction products of urea and formaldehyde containing at least 35% nitrogen, largely in insoluble but slowly available form. The water-insoluble nitrogen shall be at least 60% of the total nitrogen. The water-insoluble nitrogen in these products shall have an activity of not less than 40% when determined by the appropriate AOAC method". (New Fertilizer Materials, Ureaform, Noyes Publications, 1968, page 1).

Ureaform is a mixture of methylene urea polymers having a range of molecular weights. Such products which are now commercially available consist of three distinct fractions—water soluble nitrogen, cold water insoluble nitrogen which is hot water soluble, and hot water insoluble nitrogen—which are approximately equal in amount.

The first fraction of ureaform contains cold water soluble nitrogen (CWSN) and constitutes about a third but not more than 40% of the total nitrogen. The second and third fractions constitute together two thirds and not less than 60% of the total nitrogen. The second fraction contains the cold water insoluble nitrogen (CWIN) which is hot water soluble, and constitutes the real source of slow-release nitrogen fertilizer. The third fraction contains hot water insoluble nitrogen (HWIN) and is actually the least useful ureaform fertilizer fraction, being characterized by a very slow rate of nitrification. According to J. Agr. Food Chem., Vol. 15, No. 6, 967–9701 1967, this fraction was qualified to be of no practical value in agricultural use due to its low mineralization rate of only 10% per year.

An adequate qualitative definition of the slow-release nitrogen fertilizer fraction is reflected by the concept of "Activity Index" (AI) as determined by chemical analysis. The activity index is defined:

$$AI = \%CWIN - \%HWIN/\%CWIN \cdot 100$$

Thus, the activity index shows the relative amount of the cold water insoluble portion soluble in hot water. A low activity index indicates a poor quality ureaform product, being characterised by a high value of HWIN, whereas a high activity index indicates a better product characterised by a low value of HWIN.

The agronomic value of ureaform as a source of a long feeding nitrogen has been defined by Sauchelli, a well-known scientist in this field, as depending on two factors:

(1) The quantity of cold water insoluble nitrogen which is the source of slowly available nitrogen, and
(2) The quality of the cold water insoluble nitrogen as determined by the activity index reflecting the rate at which the cold water insoluble nitrogen becomes available.

In view of the above, all known developed processes in the ureaform field have been directed to achieve two major goals:

(a) A high yield of CWIN and (b) a high quality CWIN fraction which has a minimal amount of HWIN. Therefore, all commercial ureaform materials contain the CWIN fraction as the major component (about 28% N) but the HWIN fraction still amounts to about half the CWIN (about 14% N).

Generally, the known commercial ureaform products have an activity index of about 50 which means that 50% of the cold water insoluble nitrogen fraction is soluble in hot water. The activity index defines the quality of the cold water insoluble nitrogen fraction of ureaform at its practical nitrification rate.

The known processes for the manufacture of ureaform are generally classified in two main groups: diluted solution process and concentrated solution process. The known diluted solution process, to which the present invention is more related, involves the use of an acid catalyst for the condensation of a dilute solution of urea with formaldehyde. At an appropriate point, the acidic aqueous solution is granulated and dried. The diluted solution process has an advantage over the concentrated solution process in that the product is more uniform and can better be controlled than the concentrated solution process.

The industrial processes known to date lay emphasis on the ratio of reactants, concentrations, temperatures etc., as parameters which affect the quality of the product. Some are two stage processes where an alkaline pH is first adjusted to obtain the syntheses of methylol ureas followed by an acidic pH to initiate the polymerisation to methylene ureas. Others are one stage processes in which the medium is rendered directly acidic. In both cases, the acidic pH recommended is generally within a wide range such as 2–11 or at the acid stage 2–5.

A theoretical review of the preparation and properties of ureaform was published in Ind. Eng. Chem., Vol. 40, No. 4, 1178. In it, it is mentioned that dilute solution of urea and formaldehyde reacted at 30° C. for periods of up to 48 hours at a pH of 3.6, yielding an ill-defined product which is difficult to separate by filtration. In view of these disadvantages and the long reaction period, the authors do not recommend the method as feasible on a commercial scale.

It is the object of the present invention to provide a new method for the production of ureaform having an improved quality. It is another object of the present invention to provide a method for the production of ureaform of an improved quality wherein the largest fraction is water insoluble nitrogen of a high quality. It is yet another object of the present invention to describe a method for the production of ureaform which is characterised by a high yield.

The invention consists of a method for the production of ureaform of an improved quality which consists in the condensation of urea and formaldehyde, wherein the overall concentration of the reagents is in the range of 20% to 40% by weight, the reaction being carried out in a controlled system having a pH between 3.5 to 4.2.

It has surprisingly been found that, by very strictly controlling the pH of the reaction system with the aid of a buffered medium in a range of 3.5–4.2, and preferably between 3.8–4.0, using an overall concentration range of the reactants of 20–40% by weight, ureaform of an improved quality is achieved, having an activity index of over 75 and excellent physical properties. When the desired degree of polymerization is obtained, the reaction mixture is neutralized, the product filters readily and the mother liquor is reused in the next batch. Thus, an overall quantitative yield of product is obtained.

Due to the reasonable reaction time and easy separation by filtration, the process can also be operated on a continuous scale, when it has a particular advantage. The dissolution of the urea prills in the recycle filtrate, results in a cold feed solution which serves to balance the exothermic polymerization. Thus the performance of the method according to the present invention on a continuous scale, is characterized by a self-regulating temperature property, which enables to maintain the required temperature range for optimal polymerization without exceeding 35° C.

According to the method of the present invention, the cold water insoluble nitrogen fraction is increased in amount, being at the same time of a higher quality than the known ureaform materials. Therefore, the method according to the present invention constitutes a successful answer to achieving the two major goals stipulated by Sauchelli.

The ureaform obtained according to the present invention does indeed fall under the definition of ureaform as known from prior art and as given in the preamble of the specification. However, the product is of an improved quality in view of its higher content of cold water insoluble nitrogen and lower content of hot water insoluble nitrogen compared to commercial ureaform. A typical specification of the improved ureaform obtained according to the present invention is as follows:

| Total Nitrogen | 38–39% |
|---|---|
| Cold Water Insoluble Nitrogen | 28% |
| Hot Water Insoluble Nitrogen | 7% |
| Activity Index | 75% |

The higher cold water insoluble nitrogen content compared to the commercial ureaform also causes an increased availability of this fertilizer. As known, agriculturalists take the total nitrogen content as a basis for calculation. Therefore, the use of an ureaform with a higher cold water insoluble nitrogen and lower hot water insoluble nitrogen content means a higher available nitrogen per unit of fertilizer used compared to commercial ureaform.

The ratio in the product is around 5 urea residues to 4 methylene groups compared to 6 urea groups residues to 5 methylene groups in commercial ureaform, which also indicates a lower content of polymethylene ureas known as characteristic compounds of the hot water insoluble nitrogen fraction.

According to the present invention, the method is carried out in one stage under controlled acidity medium at a pH of 3.5–4.2 and preferably 3.8–4.0 which also enables a high yield of ureaform to be achieved. The controlled acidity medium used may be any known combination of acid and acid salt used for this pH range, such as $H_3PO_4$-$MeH_2PO_4$ (Me being an alkali metal) or organic acids and their salts. Particularly useful for agricultural application are the systems $H_3PO_4$-$KH_2PO_4$ and $H_3PO_4$-$NH_4H_2PO_4$. This controlled acidity facilitates precise control of the reaction system and obtaining of improved ureaform in a very high yield. The reaction time is generally between about 2 to 6 hours, while the temperature of the reaction is between about 15° to 40° C. The ratio between the reactants is generally in the range between 1.2 to 1.5 moles of urea to 1 mole formaldehyde, while providing that the overall concentration of the reactants is kept strictly in the parameter between 20 to 40% by weight.

In order to illustrate the nature of this invention and the manner of practicing the same, the following examples are presented for clearness of understanding only, and no limitation should be understood therefrom, since modifications to the method for carrying out the invention will be obvious to those skilled in the art.

EXAMPLE 1

5 kg. urea and 5 kg. formaline (36.8% $CH_2O$) were dissolved in 17 liters water. The pH of the reaction mixture was corrected to 3.8 by 20% $H_3PO_4$. The polymerization process was carried out at 17–30° C. by stirring for 4 hours, then neutralized to pH 8.5 with 10% KOH. The final product was filtered and dried at 65° C. The filtrate (18 liters) was reused as a solvent solution in another experiment. The final product yielded 2.1 kg. dry ureaform having the following composition: total nitrogen 38.5%; CWIN 28.2% and HWIN 7% and therefore the activity index was 75.8%.

EXAMPLE 2

Ureaformaldehyde was prepared as in Example 1. Instead of water, 18 liters of filtrate obtained in Example 1 was used. The final product yielded 5.4 kg. dry ureaform and had the following composition: total nitrogen 38.6%; CWIN 27% and HWIN only 4.4% and therefore the activity index was 82%.

EXAMPLE 3

Ureaformaldehyde was prepared as in Example 1. As a solvent, 18 liters of filtrate (Example 2) was used. The final product yielded 5.7 kg. dry ureaform and 18 liters of filtrate. The composition of the ureaform was: total nitrogen 38.6%; CWIN 28.6% and HWIN 7.3% and therefore the activity index was 74.8%.

EXAMPLE 4

Ureaform was prepared as in Example 1. As a solvent 18 liters of filtrate from Example 3 was used. The final product yielded 5.6 kg. dry ureaform and 18 liters filtrate. The product had a composition as follows: total nitrogen 38.8%; CWIN 25.6% and HWIN 4.4% and therefore the activity index was 82.8%.

EXAMPLE 5

Ureaform was prepared as in Example 1. The filtrate from Example 4 (18 liters) was used as a solvent. The final product yielded 5.3 kg. dry ureaform and 18 liters filtrate. The product had a composition as follows: total nitrogen 38.6%; CWIN 27.2% and HWIN 4.6% and therefore the activity index was 83.1%.

EXAMPLE 6

Ureaform was prepared as in Example 1. The 18 liters of filtrate from Example 5 were used as a solvent. The final product yielded 5.5 kg. of dry ureaform and had a composition as follows: total nitrogen 38.8%; CWIN 28.4% and HWIN 6.5% and therefore the activity index was 77.1%. Owing to the continuous reuse of the filtrate solution, substantially a quantitative yield of ureaform was obtained.

EXAMPLE 7

3420 g urea and 3420 g formaline (36.3%) were dissolved in 11620 g water which contained 147 g $KH_2PO_4$. The pH was adjusted to 3.85 by the addition of 50 g $H_3PO_4$ (30%). The polymerization process was carried out at 18°–30° C. by stirring for 3 hours. The reaction mixture was neutralized to pH 8.5 by 150 g of KOH (30%) and the product filtered and dried. The composition of the product was 38.5% total nitrogen, 26% CWIN and 6.1% HWIN and therefore the activity index was 76.4%. The filtrate was used for the next batch, the pH being adjusted to 3.8 by the addition of $KH_2PO_4$ and $H_3PO_4$. From the third batch onwards the yield calculated on the basis of the reactants was virtually quantitative and the concentration of the mother liquor was substantially constant.

EXAMPLE 8

Into a 10 l vessel having a conical bottom, the following reactants were introduced, and stirred: 4500 g water, 1370 g of urea prills, 60 g of $KH_2PO_4$ and 1370 g of formaline (36.3%). The pH of the mixture was adjusted to 3.8 by the addition of phosphoric acid. A steady flow of 3520 g/h urea solution (22.5%) and 790 g/h formaline was conducted into the vessel. Reaction mixture in excess of the original level was transferred into a second vessel (identical with the first) and when this was filled, it passed into a third vessel. The pH in the three vessels was kept constant by the addition of small amounts of phosphoric acid (30% concentration).

The excess from the third vessel was filtered by suction and the filtrate was used to prepare the urea feed solution. Dissolution of urea prills in the filtrate resulted in a cold feed solution (10° to 12° C.) which served to balance the exothermic nature of the polymerization reaction, so that during the whole operation the temperature did not exceed 35° C. and was in the range of 28°–32° C. The filter cake was neutralized to pH 8 with a solution of KOH (30% concentration). Over a period of 23.5 hours, 18.5 kg. of dry ureaform were obtained (about 90% cumulative yield). The composition of the product was: 26.4% CWIN; 5.7% HWIN and therefore the activity index was 78.6%. Continuation of the operation increased the cumulative yield to close to quantitative.

We claim:

1. A method for the production of ureaform of an improved quality and which has an activity index of greater than 75%, which consists in the condensation of urea and formaldehyde, wherein the overall concentration of the reagents is in the range of 20 to 40% by weight, the reaction being carried out in a controlled system having a pH between 3.5–4.2, at a temperature range of 15° C. up to 40° C. for a time range of about 2–6 hours and subsequently neutralized at the termination of the reaction wherein the molar ratio between urea and formaldehyde is in the range of 1.2 up to but not including 1.5.

2. A method for the production of ureaform of an improved quality according to claim 1, wherein the controlled acidity system used consists of $H_3PO_4$-$KH_2PO_4$.

3. A method for the production of ureaform of an improved quality according to claim 1, wherein the reaction is carried out in a controlled system having a pH between 3.8–4.0.

4. A method for the production of ureaform of an improved quality according to claim 1, wherein the temperature of the reaction is self-regulating, being in the range of 28° to 32° C.

5. A method for the production of ureaform of an improved quality according to claim 1, carried out by the diluted solution process.

* * * * *